(12) United States Patent
Park et al.

(10) Patent No.: US 7,497,511 B2
(45) Date of Patent: Mar. 3, 2009

(54) LOCKING DEVICE FOR A FOLDING SEAT IN A VEHICLE

(75) Inventors: Sang Do Park, Ansan-si (KR); Yong Cheol Jang, Ansan-si (KR)

(73) Assignees: Kia Motors Corporation, Seoul (KR); Daewon San Up Co., Ltd., Ansan-Si, Gyeonggi-Do (KR)

( * ) Notice: Subject to any disclaimer, the term of this patent is extended or adjusted under 35 U.S.C. 154(b) by 125 days.

(21) Appl. No.: 11/589,470

(22) Filed: Oct. 30, 2006

(65) Prior Publication Data

US 2007/0278833 A1    Dec. 6, 2007

(30) Foreign Application Priority Data

Jun. 5, 2006    (KR) .................. 10-2006-0050583

(51) Int. Cl.
*B60N 2/30*    (2006.01)
(52) U.S. Cl. ..................... 297/15; 296/65.09
(58) Field of Classification Search ............... 297/15, 297/335, 336, 378.12; 296/65.05, 65.09, 296/65.16, 69, 68.1
See application file for complete search history.

(56) References Cited

U.S. PATENT DOCUMENTS

| 5,662,368 | A * | 9/1997 | Ito et al. ................ 297/336 |
| 6,220,665 | B1 * | 4/2001 | Dingel et al. ............ 297/326 |
| 6,676,198 | B2 * | 1/2004 | Demptos et al. ......... 296/65.09 |
| 6,688,666 | B2 * | 2/2004 | Neale et al. ............. 296/65.09 |
| 6,793,285 | B1 * | 9/2004 | Tame ..................... 297/336 |
| 6,883,854 | B2 * | 4/2005 | Daniel .................... 296/65.03 |
| 7,066,539 | B2 * | 6/2006 | Hatta et al. ............. 297/344.14 |
| 7,201,425 | B2 * | 4/2007 | Tsujibayashi et al. .... 296/65.09 |
| 7,213,861 | B2 * | 5/2007 | Yokoyama et al. ....... 296/65.09 |
| 2006/0214477 | A1 * | 9/2006 | Fukada et al. ............ 297/15 |
| 2007/0057555 | A1 * | 3/2007 | Woods et al. ............ 297/336 |

FOREIGN PATENT DOCUMENTS

KR    1020030082787    10/2003

* cited by examiner

*Primary Examiner*—Peter R. Brown
(74) *Attorney, Agent, or Firm*—Morgan, Lewis & Bockius LLP

(57) ABSTRACT

The invention provides a locking device for a folding seat in a vehicle. The locking device includes: a locking plate connected to a first side of a seat frame of the rear seat by a rotating axis; an operating cable one end of which is connected to a center portion of the locking plate by a rotating axis so as to rotate the locking plate; a return spring in which a first end is connected to the locking plate and the second end of which is connected to a leg frame of the rear seat, thereby applying a force; a hooking indentation formed at a lower portion of the locking plate and; a locking pin fixedly installed to the leg frame of the rear seat and configured to be able to be inserted into the hooking indentation so as to be hooked by the hooking indentation.

5 Claims, 6 Drawing Sheets

LOCKING DEVICE FOR A FOLDING SEAT IN A VEHICLE

CROSS-REFERENCE TO RELATED APPLICATION

This application claims priority to Korean Patent Application No. 10-2006-0050583 filed in the Korean Intellectual Property Office on Jun. 5, 2006, the disclosures of which are incorporated herein by reference.

BACKGROUND OF THE INVENTION (a) Field of the Invention

The present invention relates to a locking device for a folding seat in a vehicle.

(b) Description of the Related Art

In a vehicle, a rear seat may be configured to be folded, double-folded, or separated to maximize the rear space in a vehicle.

As shown in FIG. 1A, the drawing shows a rear seat in which a leg portion 4 stores a rear seat 1. The leg portion 4 is supported to a vehicle body by a front catch portion 2 and a rear catch portion 3. The leg portion 4 is connected to a front striker portion and a rear striker portion of a channel fixed to a vehicle body.

The leg portion 4 is connected to the rear catch portion 3 of the rear seat 1 which operate together for storage of rear seat 1. The leg portion 4 in conjunction with the rear catch portion 3 guides the rear seat 1 into the storing space 5. The first end of the leg portion 4 is rotatably connected to a bottom surface of the storing space 5.

At this time, a locking device is provided in order to prevent the rear seat 1 stored in the storing space 5 from being shaken while a vehicle is in motion.

As shown in FIG. 1B, the locking device has a supporting bracket 12 fixed to a seat frame 11 that is located in the vicinity of a bottom surface 16 of the storing space 5. When the rear seat is stored in the storing space 5, a locker 14 is rotatably connected to the supporting bracket 12 and restored to its original location by a torsion spring 13. A locking member 15 formed at the bottom surface 16 of the storing space and coupled to the locker 14 when the rear seat is completely stored.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a locking device for a folding seat in a vehicle which prevents the front end portion of a seat from moving.

An exemplary embodiment of the present invention provides a locking device for a folding seat in a vehicle including: a locking plate connected to a first side of a seat frame of the rear seat by a rotating axis; an operating cable on a first end which is connected to a center portion of the locking plate and rotates the locking plate; a return spring on a first end which is connected to the locking plate, thereby applying a force; a hooking indentation formed at a lower portion of the locking plate and; a locking pin installed to the leg frame of the rear seat and configured to be able to be inserted into the hooking indentation and hooked by the hooking indentation.

The hooking indentation may be formed with the locking pin being inserted to contact the inner surface of the hooking indentation.

A center axis of the hooking indentation may form a tangent with respect to the circumference of the locking plate.

A lower portion of the locking plate contacting the locking pin may be arc-shaped.

DETAILED DESCRIPTION OF THE EMBODIMENTS

Figure 1A:
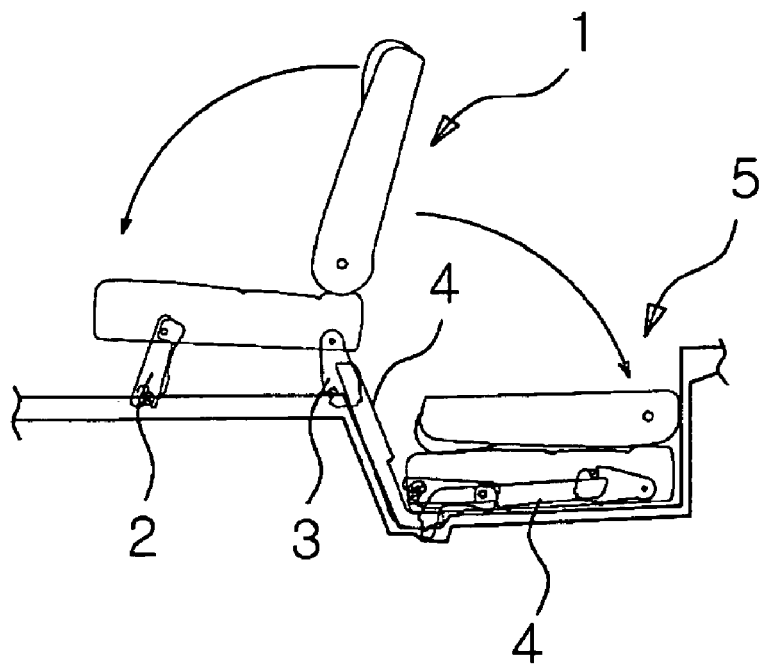
FIG. 1A and FIG. 1B are drawings showing operating states of a folding seat according to the prior art.
Figure 1B:
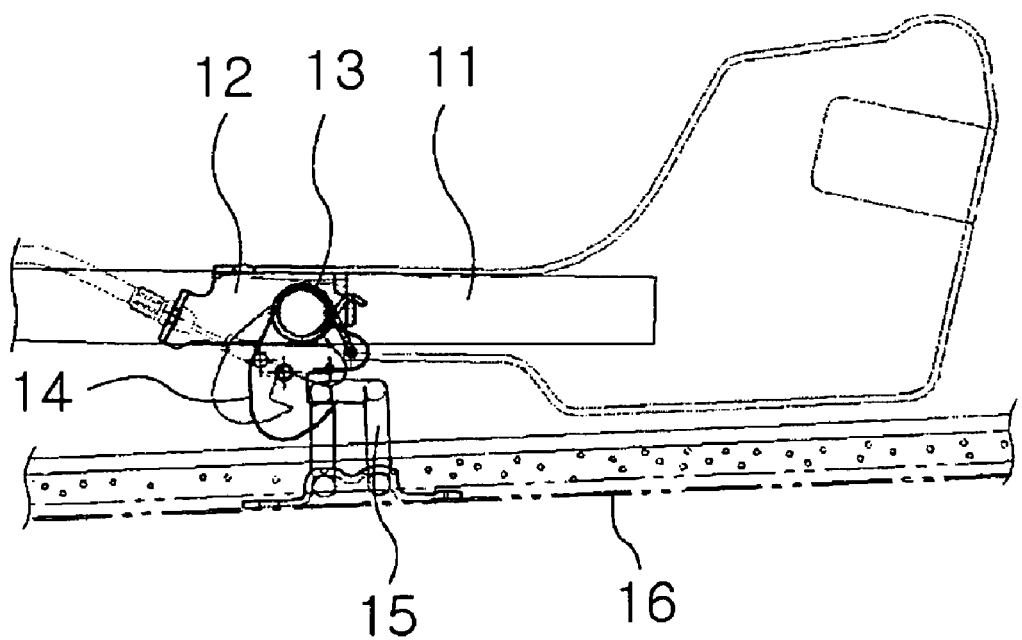
Figure 2:
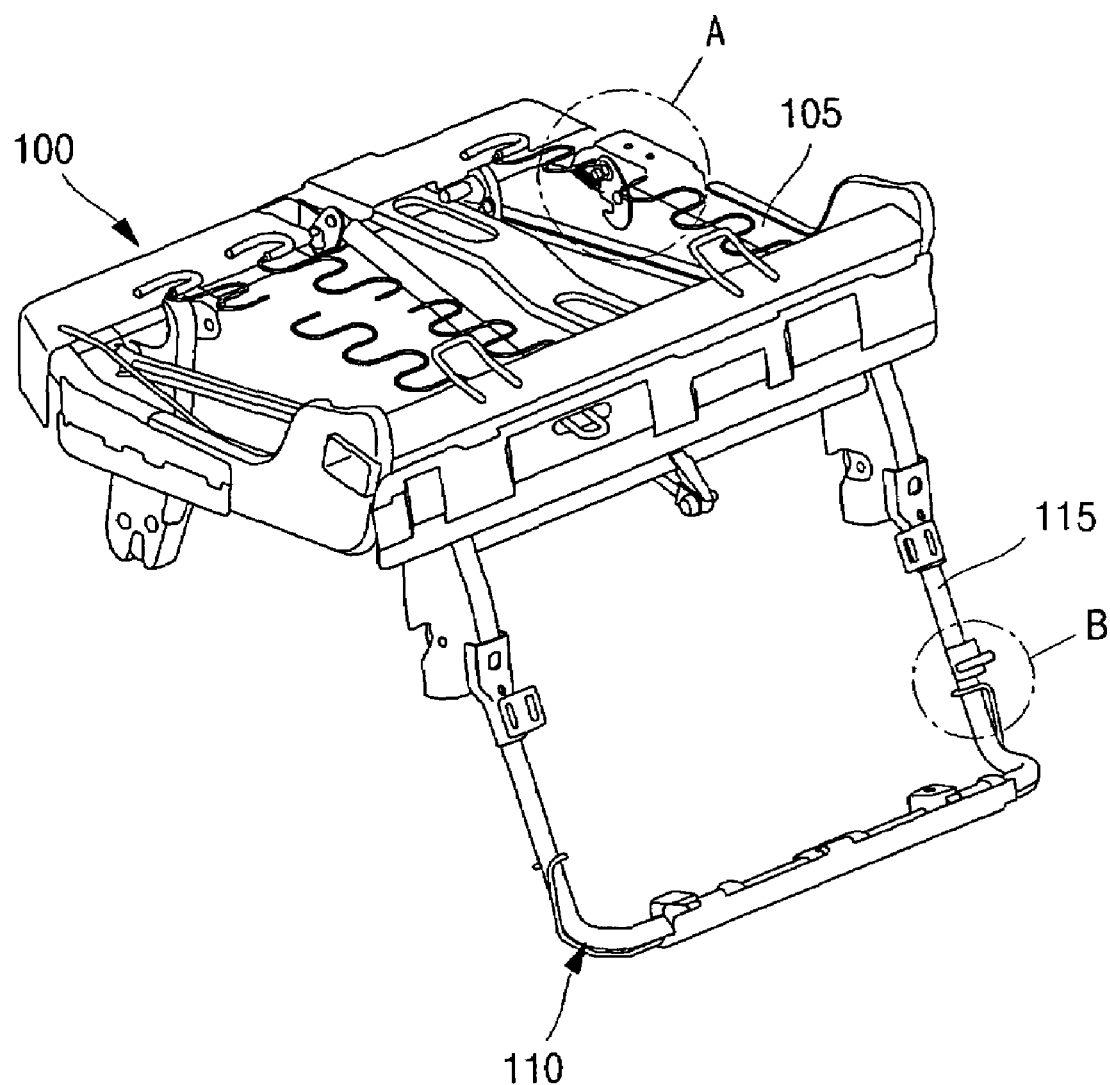
FIG. 2 is a perspective view of a locking device of a folding seat of a vehicle according to an embodiment of the present invention.
Figure 3A:
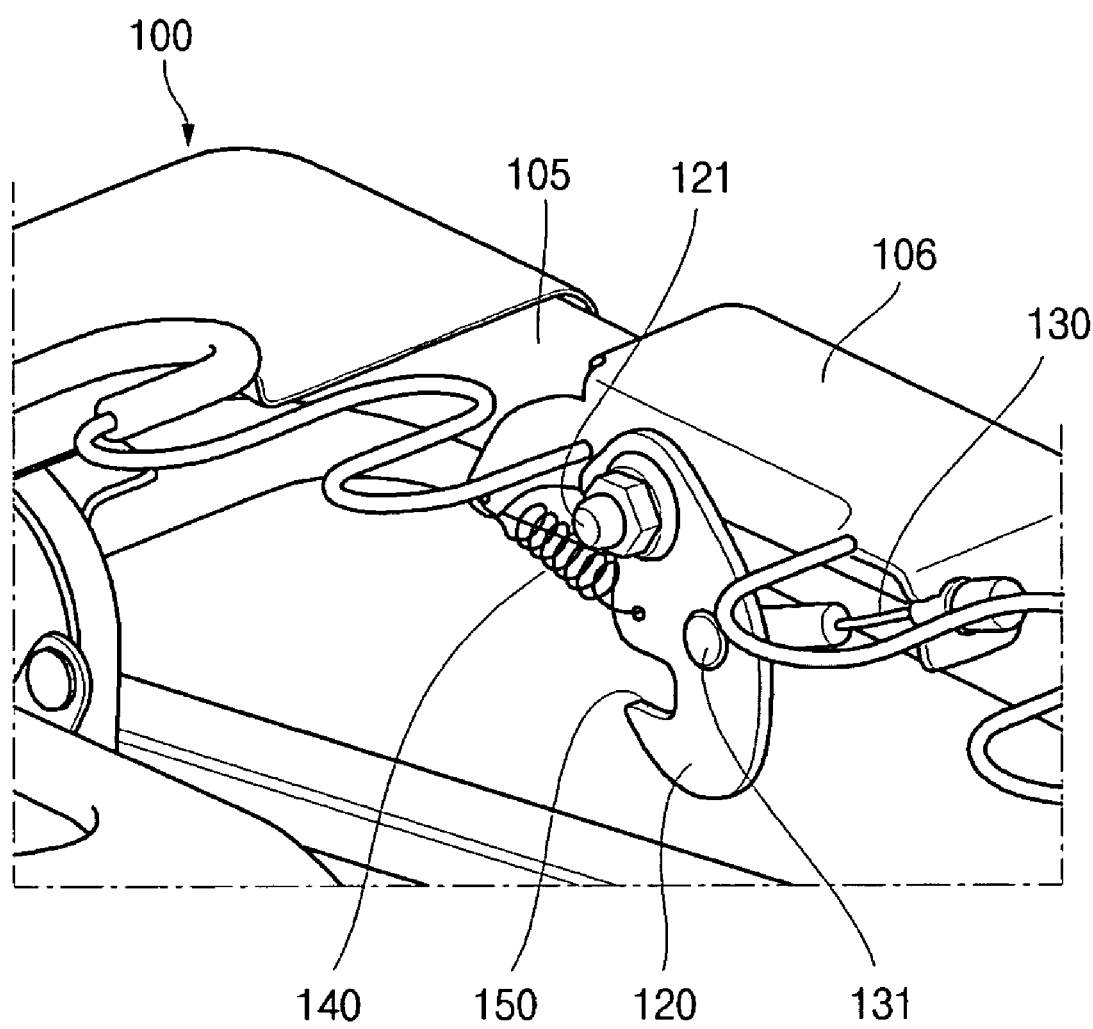
FIG. 3A is an enlarged view of a portion A of FIG. 2.
Figure 3B:
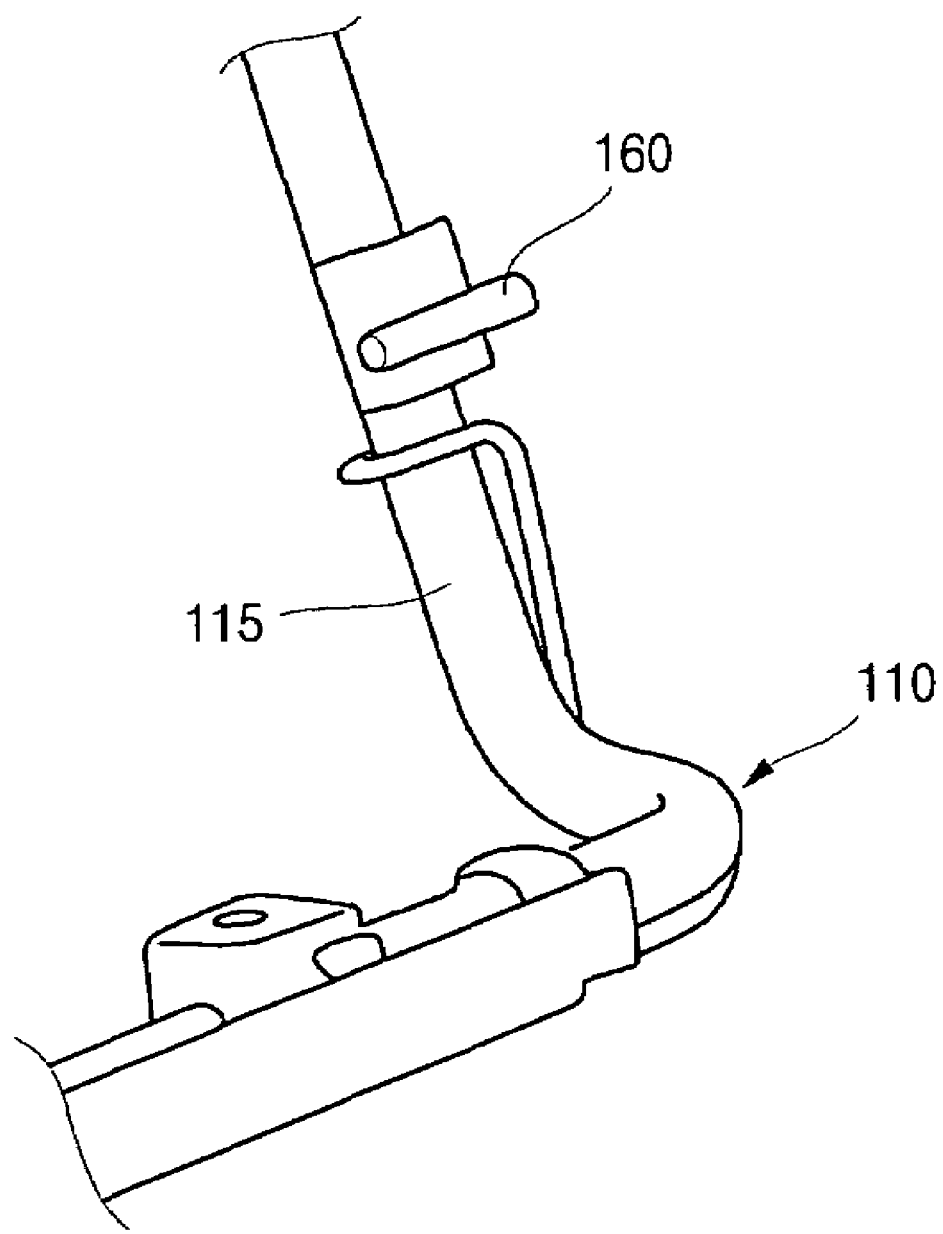
FIG. 3B is an enlarged view of a portion B of FIG. 2.

An exemplary embodiment of the present invention will hereinafter be described in detail with reference to the accompanying drawings.

Referring to FIGS. 2-4C, a locking device of a folding seat of a vehicle according to an embodiment of the present invention is described. A locking plate 120 is mounted to a side seat frame 105 forming a side frame of a seat frame 100. An operating cable 130 operates the locking plate 120. A return spring 140 is connected to the locking plate 120, and a locking pin 160 is mounted to a side leg frame 115.

The locking plate 120 is rotatably connected to the side seat frame 105 through a rotating axis 121. The locking plate 120 is fixed to the side seat frame 105 by a bracket 106. The bracket 106 is fixed to the side seat frame 105 which supports the locking plate 120. The locking plate 120 is rotatably mounted to the bracket 106 with respect to the rotating axis 121.

The locking plate 120 is positioned near the frontal end of the side seat frame 105. Accordingly, a seat fixing position by the locking plate 120 is sufficiently spaced from a hinge connection part of the leg frame 110 and the seat frame 100.

A hooking indentation 150 is formed toward the front at a lower side of the locking plate 120. The hooking indentation 150 is formed in a size in which the locking pin 160 is inserted into the hooking indentation 150 which contacts the inner surface of the hooking pin 150. A center axis of the hooking indentation 150 may be preferably formed tangentially by the circumference of the rotating locking plate 120.

A lower end of the locking plate 120 is arc-shaped. Accordingly, when the locking pin 160 is pressed down and contacts the lower end of the locking plate 120, the locking plate 120 rotates counter-clockwise with respect to the rotating axis 121 (referring to FIG. 4A). After rotation of the locking plate 120, the locking pin 160 reaches a position at which the locking pin 160 can be inserted into the hooking indentation 150. The locking plate 120 rotates clockwise by the return spring 140, thereby inserting the locking pin 160 into the hooking indentation 150.

Figure 4A:
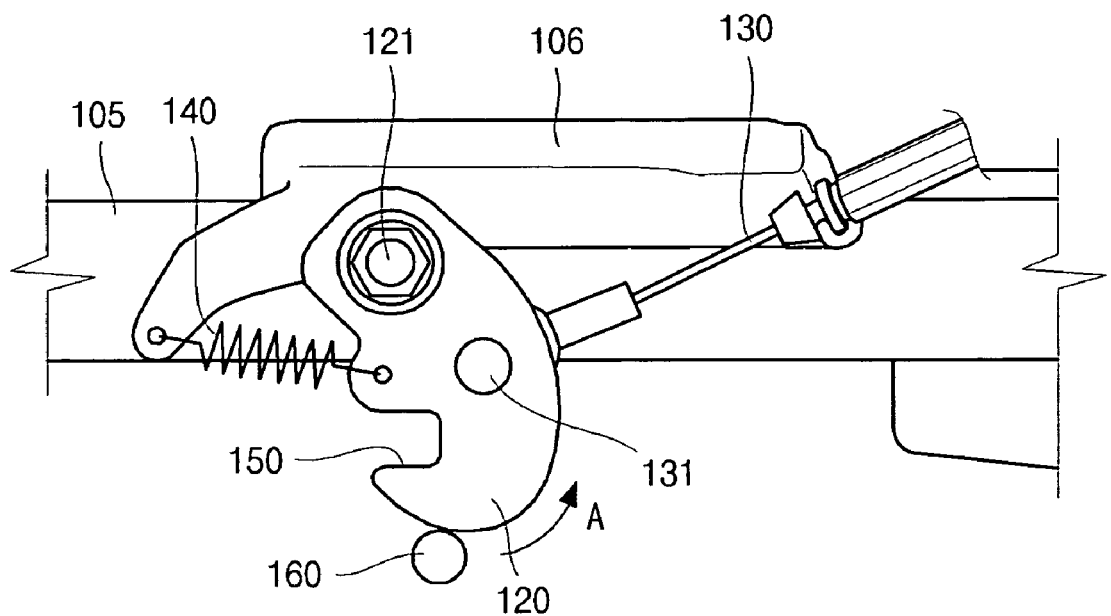
FIG. 4A to 4C are drawings showing operating states for a locking device in a folding seat of a vehicle according to an embodiment of the present invention.
Figure 4B:
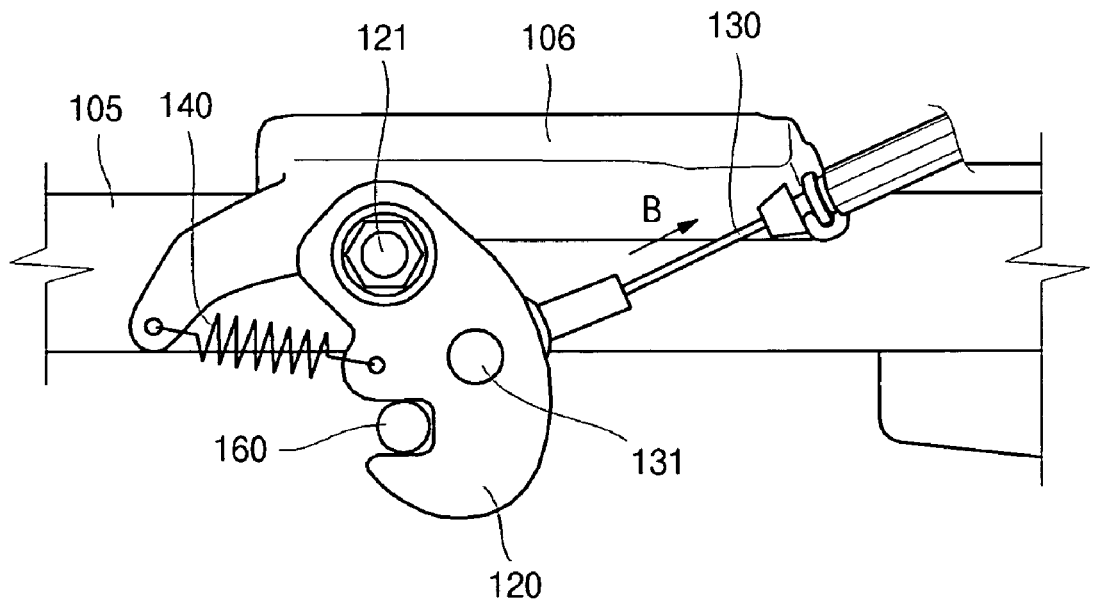

The operating cable 130 is connected to a center portion of the locking plate 120 by a pin 131, and the locking plate 120 is mounted so as to rotate in a counter-clockwise direction with respect to the rotating axis 121 by a pulling force of the operating cable 130 (referring to FIG. 4B). The operating cable 130 is connected to a release lever 135, which is installed at a lower portion of the seat frame 100 (referring to FIG. 4C).

The return spring 140 is connected to a first side of the locking plate 120 and a first side of the bracket 106 which provides power to pull the locking plate 120 forward. The return spring 140 provides a force to the locking plate 120 in a backward direction, (referring to FIG. 4B) in which the operating cable 130 pulls the locking plate 120, so that the locking plate 120 is elastically supported in a forward direction.

The locking pin 160 is installed to a side leg frame 115 which is a side of the leg frame 110 of a seat. The locking pin 160 is installed to a position to be able to be inserted into the hooking indentation 150 of the locking plate 120 during seat folding.

Figure 4C:
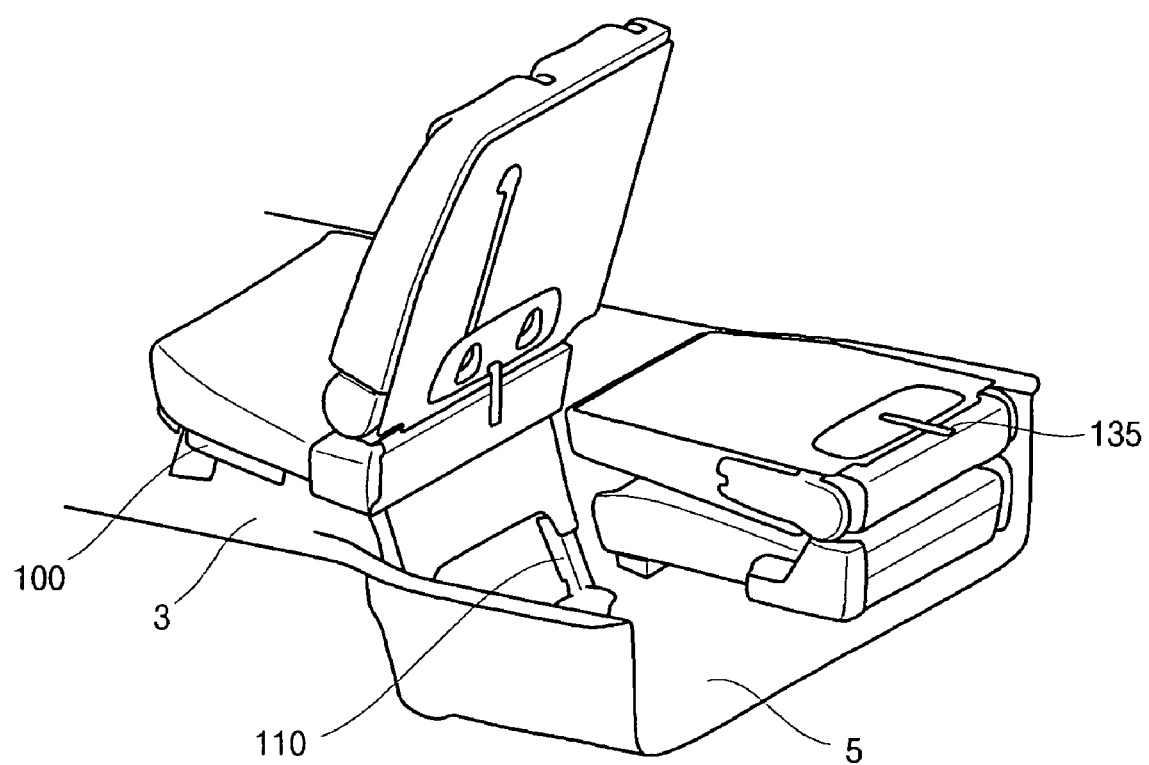

Operations of a locking device of a folding seat of a vehicle according to an embodiment of the present invention will be explained hereinafter with reference to FIG. 4A to 4C.

If the seat is pulled toward a storing space 5 with a groove in a bottom surface 3 of a vehicle so as to store the seat in the storing space 5, the side seat frame 105 rotates with respect to a hinge connection portion so as to approach the side leg frame 115.

Accordingly, as shown in FIG. 4A, the locking pin 160 installed to the side leg frame 115 which contacts the lower end of an arc-shaped locking plate 120. If a user continuously applies power for storing the seat into the storing space 5, a lower end of the locking plate 120 slides such that the locking plate 120 rotates in a direction of A with respect to the rotating axis 121.

A position of the seat frame 100 continuously lowers while the locking plate 120 rotates such that the hooking indentation 150 of the locking plate 120 is positioned at the same height with the locking pin 160.

Accordingly, since a force for rotating the locking plate 120 is removed, the locking plate 120 is pulled by the return spring 140 to its original position, such that the locking pin 160 is inserted into the hooking indentation 150 of the locking plate 120 and processes for containing the rear seat into the storing space 5 are completed.

The release lever 135 is used to return the folded rear seat, which is stored in the stored space, to its original position.

If a user manipulates the release lever 135 so as to pull the operating cable 130 in a direction of B of FIG. 4B, the locking plate 120 is rotated in a counter-clockwise direction by the operating cable 130.

The locking pin 160 is separated from the hooking indentation 150 of the locking plate 120 by the rotation of the locking plate 120.

Accordingly, a user can take the rear seat out of the storing space, and if the release lever 135 is released, the locking plate 120 returns to its original position by the return spring 140.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A locking device for a rear folding seat in a vehicle for locking the rear seat when stored in a storing space, wherein the rear folding seat includes a seat frame rotatably connected to a leg frame, and wherein the leg frame is rotatably connected to a floor of the vehicle near the storing space such that the seat can be folded into the storing space, the locking device comprising:
   a locking plate rotatably mounted to a side frame of the seat frame about a rotating axis and being provided with a hooking indentation formed toward a forward direction under the rotating axis;
   an operating cable including a first end which is connected to the locking plate, wherein the operating cable is operable by a user to rotate the locking plate such that the hooking indentation moves in a rearward direction;
   a return spring connected to the locking plate which biases the locking plate in the forward direction; and
   a locking pin installed to a side frame of the leg frame at a position at which the locking pin can be inserted into the hooking indentation of the locking plate when the seat is stored in the storing space, thereby locking the leg frame to the side frame.

2. The locking device of claim 1, wherein the locking plate is disposed near a front end of the side frame of the seat frame.

3. The locking device of claim 1, wherein a lower end of the locking plate is arc-shaped.

4. The locking device of claim 1, wherein the seat frame further comprises a bracket to which the rotating axis of the locking plate is fixed.

5. The locking device of claim 4, wherein a first end of the return spring is fixed to the bracket in front of the locking plate and a second end thereof is connected to the locking plate under the rotating axis.

* * * * *